United States Patent [19]

Ono

[11] Patent Number: 4,682,445
[45] Date of Patent: Jul. 28, 1987

[54] CERAMIC CENTER FOR MACHINE TOOLS

[75] Inventor: Katsuhiro Ono, Nagoya, Japan

[73] Assignee: NGK Insulators, Ltd., Japan

[21] Appl. No.: 760,039

[22] Filed: Jul. 29, 1985

[30] Foreign Application Priority Data

Aug. 8, 1984 [JP] Japan ............................. 59-166785

[51] Int. Cl.$^4$ ............................................. B24B 41/04
[52] U.S. Cl. ..................................... 51/236; 82/33 R; 125/10
[58] Field of Search ......................... 82/33 R; 51/236; 125/10

[56] References Cited

U.S. PATENT DOCUMENTS 2,313,963  3/1943  Patrick ................................ 82/33 R
2,675,725  4/1954  Keebler ............................... 82/33 R

FOREIGN PATENT DOCUMENTS 0035777   9/1981  European Pat. Off. .
359303   10/1937  United Kingdom .
865614    4/1961  United Kingdom .
1597471   9/1981  United Kingdom .

OTHER PUBLICATIONS

"Examiner's Report to the Comptroller under §17(5) The Search Report"—Application No. 8519693—2 pages.

Primary Examiner—Harold D. Whitehead
Attorney, Agent, or Firm—Parkhurst & Oliff

[57] ABSTRACT

A ceramic center for a machine tool, having at its one end a bearing portion for supporting a workpiece at its one end on the axis of rotation. The ceramic center is formed of a sintered ceramic mass having a rupture toughness of at least 3.5 MN/m$^{3/2}$ at a room temperature, and a density of at least 90% of the theoretical value.

19 Claims, 7 Drawing Figures

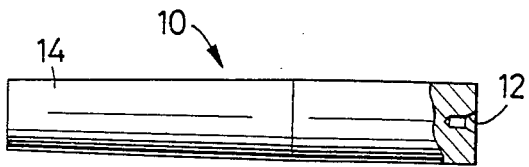
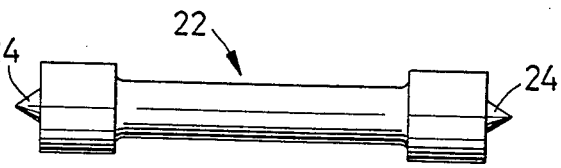
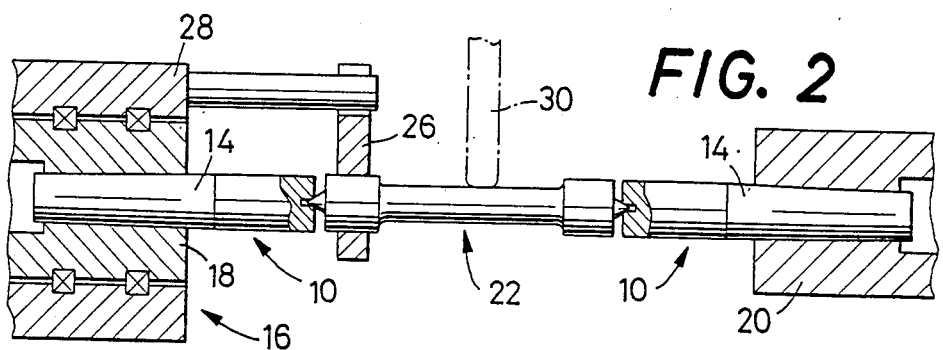
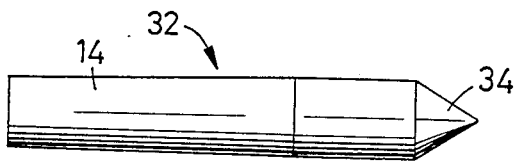
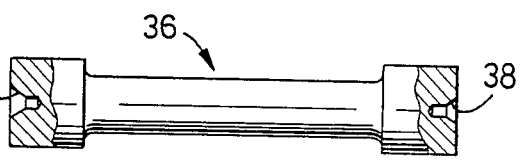
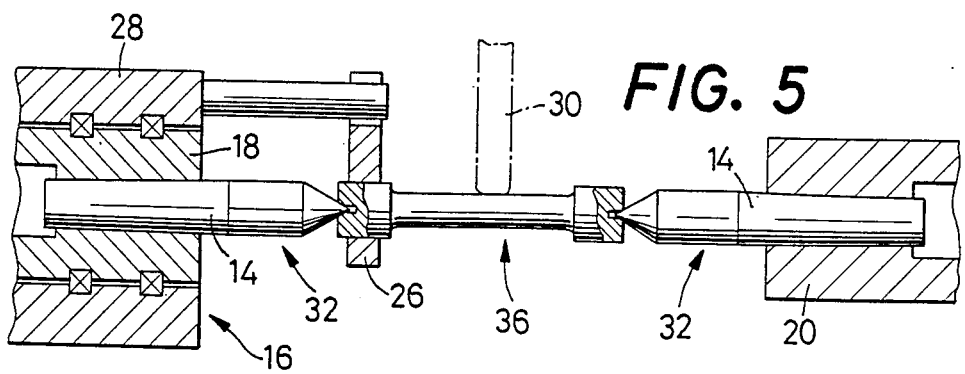

CERAMIC CENTER FOR MACHINE TOOLS

BACKGROUND OF THE INVENTION

1. Field of the Invention

The present invention relates to a center for supporting a workpiece on its axis of rotation on a machine tool to machine or grind the workpiece during its rotation.

2. Related Art Statement

In lathes, grinders and other machine tools for cutting or grinding workpieces during rotation thereof, a holding means referred to as a "center" generally used to support the workpiece rotatably about its axis, by means of engagement of bearing ends of the center with the corresponding opposite ends of the workpiece.

Materials for such centers for supporting a workpiece rotatably about its axis of rotation, are generally required to provide a high resistance to wear, since the centers in service are held in forced frictional contact with the workpiece. In view of this operating environment, the centers known in the art are made of various sintered hard alloys which have excellent wear resistance.

PROBLEM SOLVED BY THE INVENTION

It has been proved that centers of hard alloys exhibit a relatively high wear resistance and have a long service life, where they are employed for workpieces made of metallic materials. If such hard alloy centers are used for supporting ceramic workpieces, however, they wear for a short time, and are not practically usable.

SUMMARY OF THE INVENTION

The present invention, which was developed in the light of the foregoing problem encountered in the prior art, has as its primary object the provision of a center which is durable for applications to ceramic workpieces as to well as metallic workpieces.

According to the invention, there is provided a ceramic center for a machine tool wherein a machining or grinding operation is effected on a rotating workpiece, comprising a bearing portion at one end thereof for supporting a workpiece at one of its opposite ends on the axis of rotation, the ceramic center being formed of a sintered ceramic mass having a fracture toughness of at least 3.5 $MN/m^{3/2}$ at a room temperature, and a density of at least 90% of a theoretical value thereof.

In this connection, it is noted that the fracture toughness at ambient or room temperatures is a property of the center that represents its resistance to cracking, in particular. If the fracture toughness is held not less than 3.5 $MN/m^{3/2}$, the center provides practically sufficient strength, particularly in terms of resistance to cracking. It is generally preferred that the fracture toughness at room temperature be not less than 5.5 $MN/m^{3/2}$. The center tends to be easily worn out and its life expectancy is reduced, if the fracture toughness of the sintered ceramic mass at the room temperature is less than 3.5 $MN/m^{3/2}$, or if its density is less than 90% of the theoretical value. Further, if the sintered ceramic mass of the ceramic center fails to meet these lower limits of toughness and density, the center is brittle and not sufficiently resistant to damage upon erroneous setting of the center relative to the workpiece, or due to vibrations of the workpiece during a machining or grinding operation, and is therefore not satisfactory as a work holding tool used on machine tools.

According to the invention, a sintered ceramic mass of various ceramic materials may be used for the ceramic center, irrespective of the composition of the ceramic mass and the method of molding and sintering the ceramic mass into the center, provided the fracture toughness of the mass at ambient temperature is 3.5 $MN/m^{3/2}$ or higher, and its density is at least 90% of the theoretical value. Generally, the sintered ceramic mass as a center is formed of silicon nitride or partially-stabilized zirconia (PSZ) which is partially stabilized by additives such as yttria ($Y_2O_3$), magnesia (MgO) and calcia (CaO), or formed of high-toughness alumina. Generally, the ceramic mass of such ceramic materials is formed by an injection-molding process or press-molding and sintered in a normal-pressure or reactive sintering process.

The ceramic centers according to the invention may be used for supporting not only ceramic workpieces but also metallic workpieces which are ground or machined on various machine tools such as grinding and turning machines. Particularly, the present ceramic centers are suitable for rotatably supporting ceramic workpieces, which are ground on an external cylindrical grinder.

The bearing portion formed at one axial end of the ceramic center for engagement with the corresponding end of the workpiece may be provided in the form of either a coned or tapered center protrusion or coned or countersunk center hole, which is disposed for concentric engagement with the workpiece. For the ceramic centers used for supporting ceramic workpieces, however, it is preferred to provide the bearing portion with a coned or countersunk center hole, because it is easier to provide the ceramic workpieces with portions which are engageable with the bearing portion of the ceramic center. Namely, it is easier to form center protrusions from a ceramic workpiece, than to form center holes in the ceramic workpiece.

As indicated above, when the bearing portion of the ceramic center is provided with a coned or tapered center protrusion extending from one end of the center, the workpiece is formed with a coned center hole into which the coned center protrusion of the ceramic center fits. On the other hand, when the bearing portion of the ceramic center is provided with a coned or countersunk center hole, the workpiece is formed with a coned or tapered center protrusion which fits into the coned center hole of the ceramic center. In either case, it is necessary to form a center hole in either one of the ceramic center and the workpiece. In the case where the workpieces are made of a ceramic material, it is better to form the bearing portion of the ceramic center with a coned center hole, since it eliminates cumbersome and difficult steps of forming center holes in each of the individual workpieces, which may be machined or ground in a relatively large lot size. The elimination of these steps will result in improved overall efficiency of working on the ceramic workpieces.

BRIEF DESCRIPTION OF THE DRAWINGS

The foregoing and other objects, features and advantages of the present invention will become more apparent from reading the following detailed description, when considered in connection with the accompanying drawing, in which:

FIG. 1 is an elevational view partly in cross section of one form of a ceramic center of the present invention;

FIG. 2 is a fragmentary, elevational view partly in cross section of a cylindrical grinder equipped with the ceramic centers of FIG. 1, illustrating a workpiece held between the centers;

FIG. 3 is a view in elevation of the workpiece of FIG. 2;

FIG. 4 is a view in elevation of another form of the ceramic center;

FIG. 5 is a view, corresponding to FIG. 2, showing a cylindrical grinder equipped with the centers of FIG. 4 to hold a workpiece between the centers;

FIG. 6 is an elevational view partly in cross section of the workpiece of FIG. 5.

DETAILED DESCRIPTION OF THE INVENTION

Figure 7:
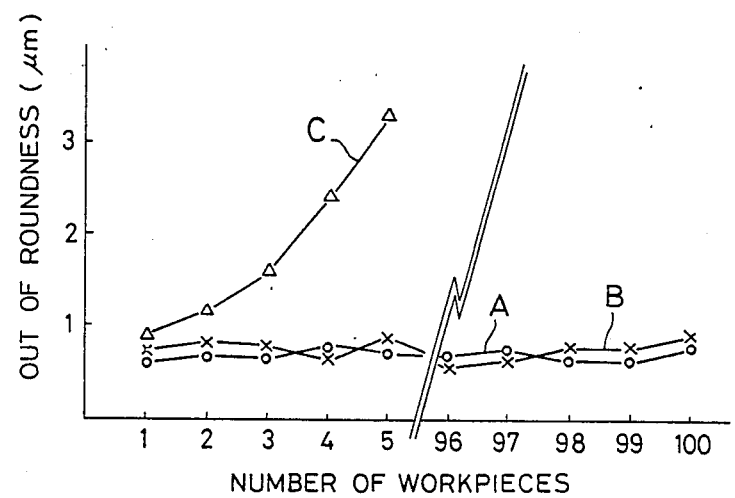
FIG. 7 is a graph showing a wear resistance of the centers of FIGS. 1 and 4 of the invention, as compared with that of the conventional center, the wear resistance being expressed as out-of-roundness or trueness of workpieces which were ground while supported between the centers.

Two different forms of ceramic centers of the invention for use on cylindrical grinding machines are illustrated in FIGS. 1 and 4.

Referring first to FIG. 1, there is shown a ceramic center 10 fabricated according to the invention, which has a coned or countersunk center hole 12 in one of its axial opposite end faces. The end with this coned center hole 12 serves as a bearing portion. The center 10 has a tapered portion 14 remote from the bearing portion with the center hole 12. In application, two pieces of the ceramic center 10 are used, for example, on a cylindrical grinder as shown in FIG. 2, one of the ceramic centers 10 being mounted in a spindle 18 of a headstock 16, and the other in a tailstock 20, such that the tapered portion 14 fits in the hole in the spindle 18 or tailstock 20. A workpiece to be supported by these ceramic centers 10 is typically a round bar or shaft member indicated at 22 in FIG. 3, which is made of a ceramic material. As previously described, the instant ceramic center 10 is particularly effective for ceramic workpieces. The workpiece shaft 22 has integrally formed, coned or tapered center protrusions or tips 24, 24 which extend from opposite longitudinal ends of the shaft. The workpiece shaft 22 is held between the ceramic centers 10 mounted on the grinder, such that the opposite coned center protrusions 24 fit in the coned center holes 12 of the ceramic centers 10, as depicted in FIG. 2.

In order to turn the workpiece 22 during an external grinding operation on its circumferential surface, one end of the workpiece 22 on the side of the headstock 16 is gripped by a dog 26 which is connected to a dog plate 28, as shown in FIG. 2. The dog plate 28 is disposed around the spindle 18 so that they are rotatable relative to each other. A rotating grinding wheel 30 is brought into contact with the outer surface of the workpiece 22 while the workpiece 22 is rotated about its axis by means of the dog plate 28. Usually, the grinding wheel 30 is rotated in the direction opposite to the rotating direction of the workpiece 22. However, the grinding wheel 30 and the workpiece 22 may be rotated in the same direction. The angle of taper of the tapered portion 14 and the angle of the coned center hole 12 of the ceramic center 10, and the angle of taper of the coned center protrusions 24 of the workpiece 22, may be suitably selected, depending upon the specific working environment.

Another form of a ceramic center is shown at 32 in FIG. 4, a body of which is substantially identical in shape to the ceramic center 10 of FIG. 1. The ceramic center 32 differs from the ceramic center 10, in that the center 32 has a bearing portion in the form of a coned center point or protrusion 34 which extends from the end opposite to the tapered portion 14. A workpiece shaft 36 to be supported by the ceramic centers 32 is formed at its opposite ends with coned or countersunk center holes 38, 38, as shown in FIG. 6. The workpiece 36 is held between the ceramic centers 32 such that the coned center protrusions 34 of the centers 32 fit in the coned center holes 38 of the workpiece 36, as shown in FIG. 5. The workpiece 36 is ground in the same manner as previously described in connection with the workpiece 22.

EFFECT OF THE INVENTION

As described hitherto, the ceramic center according to the invention is formed of a sintered ceramic mass having a fracture toughness of at least 3.5 MN/m$^{3/2}$ at room temperature, and a density of at least 90% of the theoretical density. The sintered ceramic mass of such properties has a considerably increased resistance to wear, and a practically sufficient resistance to fracture, even if it is used for a workpiece of a ceramic material. Thus, the ceramic center of the invention is superior in durability, and contributes a great deal to improvement in efficiency of machining or grinding of ceramic workpieces. These are industrially significant aspects of the present invention.

EXAMPLES

To further illustrate the concept of the present invention, some examples of ceramic centers of the invention will be described. However, it is to be understood that the invention is by no means confined to the details of these examples.

Two ceramic centers 10 of FIG. 1 were fabricated by molding and firing a mass of zirconia ($ZrO_2$) containing 3 mole % of yttria ($Y_2O_3$). These ceramic centers 10 exhibited a fracture toughness of 8 MN/m$^{3/2}$ at room temperature, a bending strength (flexural strength) of 1000 MPa in a four-point bending test at the room temperature, and a density of 5.91 (97% of the theoretical value). Also, a large number of shafts 22 of FIG. 3 were prepared from silicon nitride, as the workpieces to be ground. The workpieces 22 were ground successively on the cylindrical grinder shown in FIG. 2, while they were supported by and between the ceramic centers 10. The trueness or out of roundness of the ground portion of the workpieces 22 was measured. The measurements are indicated by the broken line A in FIG. 7.

The ceramic centers 10 were formed with the tapered portion 14 of Morse taper No. 4, and with the coned center hole 12 having a cone angle of 60 degrees. The workpiece shafts 22 were formed with the coned center protrusions 24 having a taper angle of 60 degrees to fit in the center holes 12 of the ceramic centers 10, and formed with an outside diameter of 20 mm and a length of 120 mm. The workpieces 22 were ground with the grinding wheel 30 in the form of a diamond wheel containing diamond particles.

Further, two ceramic centers 32 of FIG. 4 were obtained by molding of a silicon nitride material in an ordinary manner, and by sintering the molded mass of silicon nitride under atmospheric pressure. Also, a number of shafts 36 of FIG. 6 were prepared from the same silicon nitride material as used to make the shafts 22. These workpieces 36 were ground while they were held between the ceramic centers 32, in the manner as shown in FIG. 5. The trueness or out of roundness of the ground portion of the workpieces 36 was measured. The measurements are indicated by the broken line B in FIG. 7.

The ceramic centers 32 demonstrated a fracture toughness of 6 $MN/m^{3/2}$ at room temperature, a bending strength of 850 MPa in a four-point bending test at room temperature, and a density of 3.10 (93% of the theoretical value). Like the ceramic centers 10, the ceramic centers 32 were formed with the tapered portion 14 of Morse taper No. 4, and with the coned center protrusion 34 of 60 degrees. The workpieces 36 were formed with the 60-degree coned center holes 38. A diamond wheel was used as the grinding wheel 30, and the workpieces 36 had the same diameter and length as the workpieces 2.

Comparative samples of the same shape as the ceramic center 32 were made of a WC-base hard alloy. By using these comparative hard alloy centers, the workpieces 36 of silicon nitride were successively ground. The trueness of the ground portion of the workpieces 36 was measured. The measurements are indicated by broken line C in FIG. 7.

As is aparent from the graph of FIG. 7, the wear of the comparative WC-based hard alloy centers became serious and the out-of-roundness of the ground workpieces 36 was increased to an impermissible level, after the centers had been used for grinding the four or five workpieces 36. On the other hand, the wear of the ceramic centers 10 of partially-stabilized zirconia and the ceramic centers 32 of silicon nitride, both according to the invention, was held at considerably lower levels, and the out-of-roundness of the workpieces 22, 36 was kept within one micron, even after the ceramic centers 10, 32 had been used for grinding 100 pieces of the workpieces.

While the present invention has been described with a certain degree of particularity, it will be obvious that the invention may be embodied with various changes, modifications and improvements which may occur to those skilled in the art, in the light of the foregoing teaching, and without departing from the scope of the invention defined in the appended claims.

What is claimed is:

1. A ceramic center for a machine tool, said machine tool performing a machining or grinding operation upon a rotating workpiece, said ceramic center comprising a sintered ceramic mass having a bearing portion at a first axial end thereof for supporting said workpiece at one end on its axis of rotation, said sintered cearmic mass having a fracture toughness of at least 3.5 $MN/m^{3/2}$ at room temperature, and a density of at least 90% of theoretical density.

2. A ceramic center according to claim 1, wherein said sintered ceramic mass has a fracture toughness of at least 5.5 $MN/m^{3/2}$ at room temperature.

3. A ceramic center according to claim 1, wherein said sintered ceramic mass comprises partially-stabilized zirconia.

4. A ceramic center according to claim 1, wherein said workpiece comprises a ceramic material.

5. A ceramic center according to claim 1, wherein said bearing portion includes a coned center hole formed in said one end of the ceramic center for concentric engagement with the workpiece.

6. A ceramic center according to claim 1, wherein said bearing portion includes a coned center protrusion extending from said one end of the ceramic center for concentric engagement with the workpiece.

7. A ceramic center according to claim 1, wherein said sintered ceramic mass comprises silicon nitride.

8. A ceramic center according to claim 1, wherein said sintered ceramic mass has a fracture toughness of at least 8 $MN/m^{3/2}$ at room temperature.

9. A ceramic center according to claim 1, wherein said sintered ceramic mass has a four-point flexural strength at room temperature of at least 850 MPa.

10. A ceramic center according to claim 1, wherein said sintered ceramic mass has a four-point flexural strength at room temperature of at least 1,000 MPa.

11. A ceramic center according to claim 1, wherein said sintered ceramic mass has a density of least 93% of theoretical density.

12. A ceramic center according to claim 1, wherein said sintered ceramic mass has a density of least 97% of theoretical density.

13. A ceramic center for a machine tool, said machine tool performing a machining or grinding operation upon a rotating ceramic workpiece, said ceramic center comprising a sintered ceramic mass selected from the group consisting of partially stabilized zirconia and silicon nitride, the sintered ceramic mass having a fracture toughness of at least 3.5 $MN/m^{3/2}$ at room temperature and a density of at least 90% of theoretical density, the ceramic center having a bearing portion at a first axial end thereof for supporting said workpiece, said bearing portion including a feature selected from the group consisting of a coned center hole and a coned center protrusion which concentrically engages with the workpiece.

14. A ceramic center according to claim 13, wherein said sintered ceramic mass has a fracture toughness of at least 5.5 $MN/m^{3/2}$ at room temperature.

15. A ceramic center according to claim 13, wherein said sintered ceramic mass has a fracture toughness of at least 8 $MN/m^{3/2}$ at room temperature.

16. A ceramic center according to claim 13, wherein said sintered ceramic mass has a four-point flexural strength at room temperature of at least 850 MPa.

17. A ceramic center according to claim 13, wherein said sintered ceramic mass has a four-point flexural strength at room temperature of at least 1,000 MPa.

18. A ceramic center according to claim 13, wherein said sintered ceramic mass has a density of least 93% of theoretical density.

19. A ceramic center according to claim 13, wherein said sintered ceramic mass has a density of least 97% of theoretical density.

* * * * *